Oct. 6, 1959  P. J. LEGER  2,907,372
COMBINATION SCOOTER, WALKER AND STROLLER
Filed Nov. 19, 1956  2 Sheets-Sheet 1

INVENTOR
PATRICK J. LEGER
BY
ATTORNEY

Oct. 6, 1959 P. J. LEGER 2,907,372
COMBINATION SCOOTER, WALKER AND STROLLER
Filed Nov. 19, 1956 2 Sheets-Sheet 2
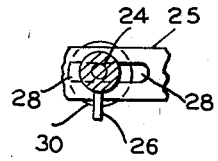
FIG. 4
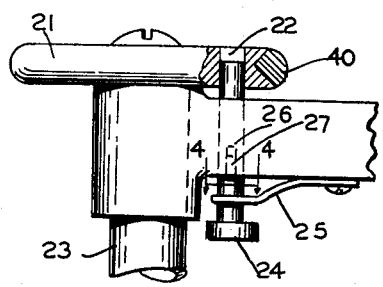
FIG. 3
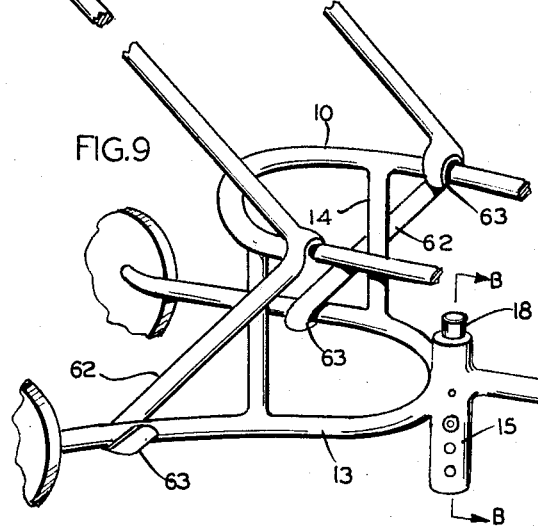
FIG. 9
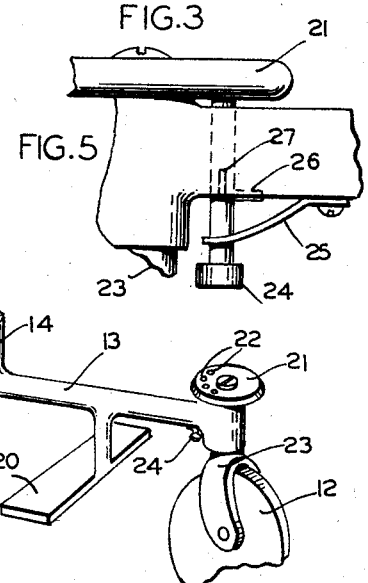
FIG. 5
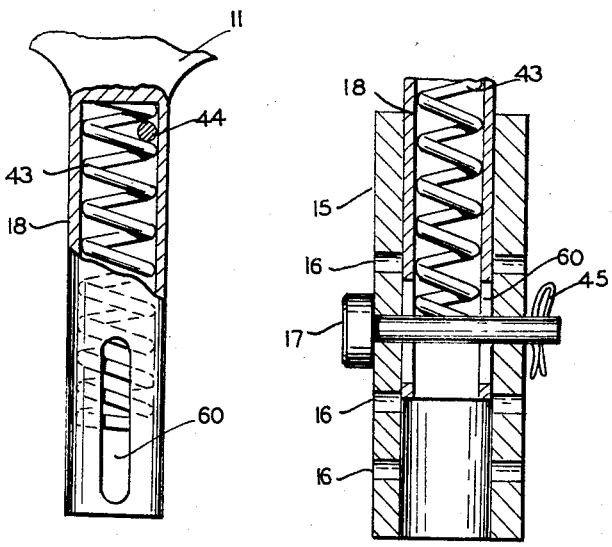
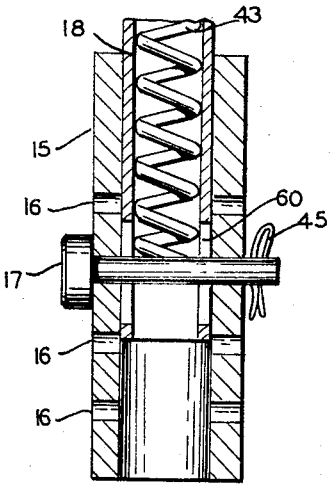
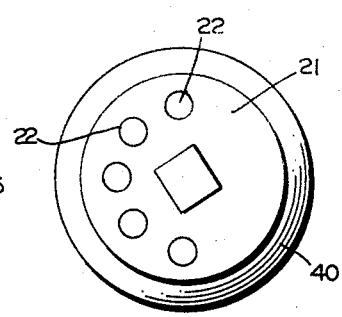
FIG. 6
FIG. 7    FIG. 8
INVENTOR.
PATRICK J. LEGER
BY Charles R. Fay
ATTORNEY

United States Patent Office 2,907,372
Patented Oct. 6, 1959

2,907,372
COMBINATION SCOOTER, WALKER, AND STROLLER

Patrick J. Leger, Gardner, Mass.

Application November 19, 1956, Serial No. 623,178

1 Claim. (Cl. 155—22)

This invention relates to a combination convertible scooter, walker, and stroller for infants, and the principal object of the invention resides in the provision of a relatively simple device of the class described which may be used as a stroller, walker or scooter and which is provided with dirigible wheel means which may be locked in position so that when the device is used as a walker, the occupant is enabled to propel the same in a circle only, said circle being made adjustable by adjusting the degree of angle of the dirigible wheel with respect to the longitudinal axis of the device.

Other objects of the invention include the provision of a novel adjustment of a seat member; a novel safety frame device for the protection of the infant, and a novel removable pusher type handle for use of the device as a stroller.

Other objects and advantages of the invention will appear hereinafter.

Reference is to be had to the accompanying drawings, in which:

Fig. 3 is an enlarged detail view, partly in section illustrating the adjustment of the dirigible wheel;

Fig. 4 is a section on line 4—4 of Fig. 3 on an enlarged scale;

Fig. 5 is a view similar to Fig. 4 showing the dirigible wheel unlocked;

Fig. 6 is a plan view of the adjustable plate for the dirigible wheel;

Fig. 7 is a view, partly in section, illustrating the construction of the standard for the seat;

Fig. 8 is an enlarged section on line 8—8 of Fig. 9; and

Fig. 9 is a perspective view with parts omitted but illustrating the attachment of the detachable handle.

Figure 1:
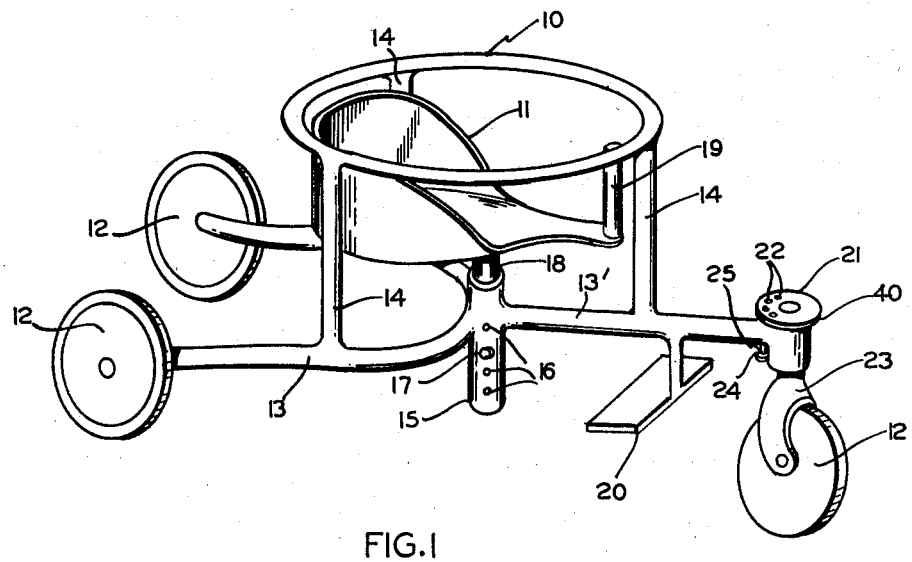
Fig. 1 is a perspective view of the device.

Referring to the drawings, the reference numeral 10 indicates a generally annular member of tubing or rod, which acts as a restraining or safety means for the infant who occupies the seat indicated generally at 11. This seat is vertically adjustable within the frame of the circle 10 by means to be described, and the entire device is mounted on a plurality of wheels which are generally indicated at 12.

Figure 2:
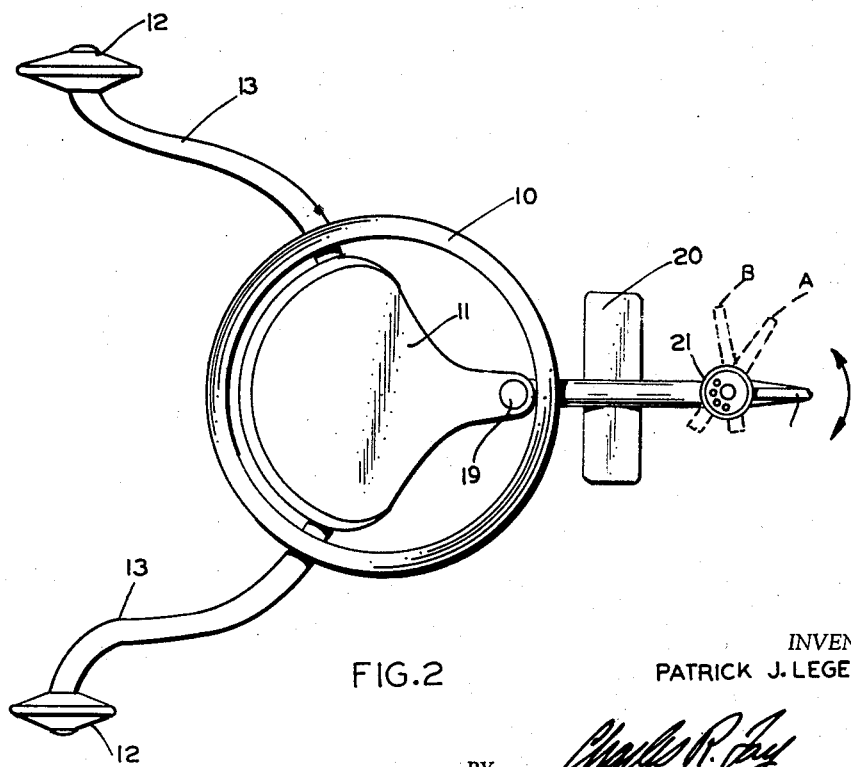
Fig. 2 is a top plan view thereof.

The rear wheels 12 are mounted upon the frame members 13 as shown in Figs. 1 and 2 and these frame members may likewise be bent tubing, rod or the like. The reference numeral 14 indicates uprights or standards which may also be tubular and support the circular member 10 from the framework 13 and the forwardly-extending frame member indicated at 13'.

A forward wheel 12 is mounted upon the extending member 13' and is mounted as a caster to allow the device to be easily steerable.

At the juncture of members 13 and 13', there is a vertical sleeve or the like 15 provided with a series of apertures 16 therein for the selective reception of a pin 17. This pin 17 is used to support the standard 18 supporting seat 11 in vertically adjustable position within the annular member 10 and the framework comprising the members 14. The seat 11 may be provided with a guard-post 19 for the child to grasp and to prevent the child from slipping out of the seat, and member 13' may be provided with a depending footrest 20 for the use of the child.

The caster 12 may be fixed in angular position so that the device when used as a walker may only proceed in a circle, and this is accomplished through the use of a disc 21 having a series of apertures 22 therein, the disc 21 being secured to the fork 23 mounting the dirigible wheel 12. As best shown in Figs. 3 and 5, a manually retractable pin 24 is provided with a yoke friction spring 25 having legs 28 working in a groove 30 to hold it in position. This pin may be elevated or depressed in order to selectively engage one of the holes 22 in the disc 21 so as to maintain the wheel 12 in an angular position and ensure that the vehicle may proceed in a circle only. The pin 24 may be provided with a cross-pin 26 working in a slot 27 and may be held in its downward position free of the wheel 21 by turning so as to mis-align pin 26 with respect to the slot 27.

The disc 21 may be provided with a rubber tire 40 and this will act as a bumper for walls and furniture. However, by using the dirigible wheel 12, it will be seen that the child may be constrained to stay within a yard and cannot walk the device into the street or the child is restricted within a certain circle in a room wherein the vehicle will not engage the walls or furniture if the device is properly positioned.

The support 18 for the seat 11 may be spring-mounted by the spring 43 as shown in Figs. 7 and 8. Spring 43 finds its lowermost support on the cross-pin 17 which is held in position by a cotter-pin 45. By reason of slots 60, the seat may bounce up-and-down to a limited degree, always being urged upwardly by the spring 43. A pin 44 may be inserted in the spring 43 in order to maintain the spring in position within the column 18 while the pin 17 is retracted for purposes of adjustment.

A detachable handle generally indicated at 61 may be applied to the device by means of legs 62 and brackets 63 which rest on the circular frame 10 and extend under the corresponding frame parts 13, see Fig. 9.

Having thus described my invention and the the advantages thereof, I do not wish to be limited to the details herein disclosed, otherwise than as set forth in the claim, but what I claim is:

A detachable handle for child's vehicle of the class described wherein the vehicle comprises a body member having an annular frame guard member, and means supporting the annular frame guard member in elevated position above the body member in position to restrain the child, said detachable handle comprising a U-shaped member including integral fixed hook-like downwardly disposed brackets adapted to be disposed upon said annular guard member, and additional similar upwardly disposed brackets on the handle adapted to engage with said body member, said brackets adapted to detachably hold said handle in position on said vehicle.

References Cited in the file of this patent

UNITED STATES PATENTS

| | | | |
|---|---|---|---|
| D. 148,552 | Marcus | Feb. 3, | 1948 |
| 87,933 | Holtz | Mar. 16, | 1869 |
| 113,103 | Simonds | Mar. 28, | 1871 |
| 1,662,292 | Bender | Mar. 13, | 1928 |
| 1,790,195 | Baker | Jan. 27, | 1931 |
| 1,793,848 | Gill et al. | Feb. 24, | 1931 |
| 1,952,467 | Slee | Mar. 27, | 1934 |
| 2,081,594 | McIntosh | May 25, | 1937 |
| 2,296,415 | Baker et al. | Sept. 22, | 1942 |
| 2,425,253 | Little et al. | Aug. 5, | 1947 |
| 2,817,539 | Stevens | Dec. 24, | 1957 |